Aug. 28, 1934.  C. W. MARSH  1,971,422
OIL SEAL
Filed Feb. 25, 1933
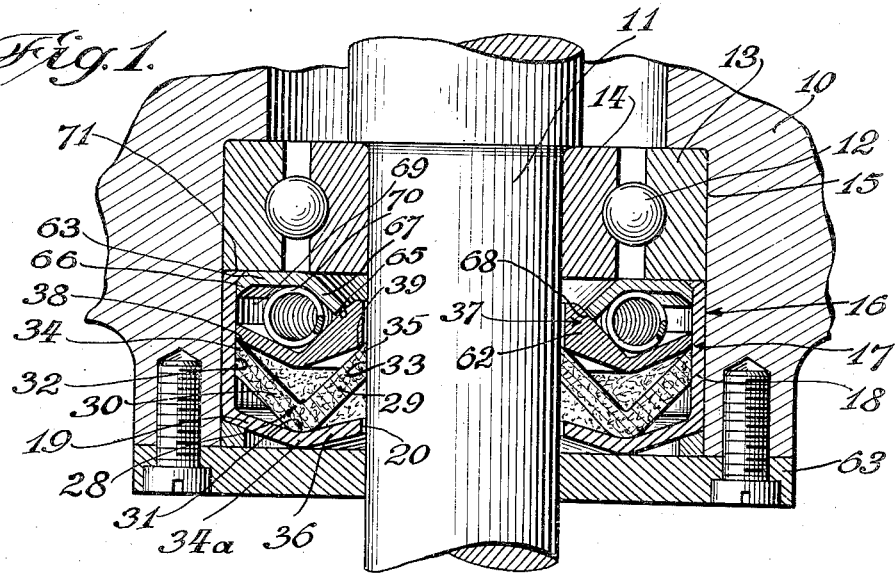
Fig. 1.
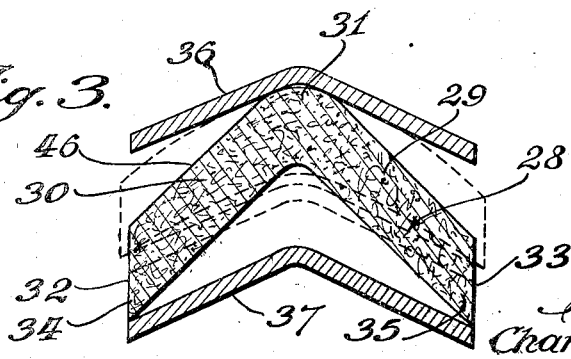
Fig. 2.
Fig. 3.
Inventor:
Charles W. Marsh
By Williams, Bradbury, McCaleb & Hinkle
Attys.

Patented Aug. 28, 1934

1,971,422

UNITED STATES PATENT OFFICE 1,971,422

OIL SEAL

Charles W. Marsh, Muskegon, Mich.

Application February 25, 1933, Serial No. 658,541

2 Claims. (Cl. 288—1)

REISSUED

The present invention relates to oil seals of the type adapted to be used about a shaft to prevent the leakage of lubricant along the shaft, but the present devices are also of general application and may be utilized for many other purposes.

The present application is a continuation in part of my prior application, Serial No. 554,841, filed August 3, 1931, now Patent No. 1,901,606, granted March 14, 1933, for Oil seals, and relates particularly to one of the modifications disclosed in said prior application, but not covered thereby.

One of the objects of the invention is the provision of an improved oil seal which is adapted to give long continuous service without necessity for repair, by virtue of the provision of a means for automatically compensating for the wear of the parts of the oil seal.

Another object of the invention is the provision of an improved oil seal adapted to eliminate any possibility of metallic parts of the seal wearing through the packing or otherwise coming in contact with the moving shaft.

Another object of the invention is the provision of an improved oil seal peculiarly adapted to withstand considerable wear and usage and adapted to automatically take up the wear and compensate for the same throughout a long life of service.

Another object of the invention is the provision of an improved oil seal in which the packing may be removed and conveniently replaced, thereby facilitating the maintenance of the seal in the best condition at all times.

Another object of the invention is the provision of an improved oil seal which may be cheaply manufactured and installed by virtue of the fact that most of the parts of the seal lend themselves readily to manufacture by stamping operations.

Another object of the invention is the provision of a plurality of modifications of my improved oil seal, each one of which has advantages which are the result of the particular construction of such modification.

Other objects and advantages of the invention will be apparent from the following description and from the accompanying drawing, in which similar characters of reference indicate similar parts of the several views.

Referring to the single sheet of drawing accompanying this description,

Fig. 1 is a fragmentary sectional view taken on a plane passing through the axis of the shaft, showing the shaft in elevation and the details of the oil seal and its mode of installation in cross section;

Fig. 2 is a similar fragmentary view of another modification employing a pressed metal sheet as an expanding ring;

Fig. 3 is an enlarged sectional view of one of the V-shaped packings and expanding members, showing in dotted lines the mode of expansion of the packings into edgewise engagement with the adjacent parts.

Referring to Fig. 1, 10 indicates the frame or casing of a machine upon which the present oil seal is used, such as, for example, an electric motor having a shaft 11 which is rotatably mounted upon the ball bearings 12 located in the races 13 and 14. The race 13 is fixedly secured in the bore 15 of the frame 10 and the numeral 16 indicates one of the improved oil seals in its entirety.

In the installation which has been selected to illustrate the invention, only one oil seal 16 is employed, but it should be understood that Fig. 1 is merely a fragmentary view and similar oil seals may be used upon both sides of the anti-friction bearings for confining lubricant about the bearings, and the lubricant may be supplied by packing the bearings during installation or by the use of standard high pressure fittings. The installation shown is merely exemplary of one of the many modes of use of my improved oil seals.

The oil seal 16 is preferably provided with a casing 17, preferably stamped out of sheet metal such as steel, and formed with a substantially cylindrical flange 18 and a radially extending flange 19. The radially extending flange 19 is provided with an aperture 20 which is definitely larger than the size of shaft 11, and the casing 17 is preferably fixedly secured in the bore 15 in such a manner that the edges of the flange 19 or any other metallic parts of the oil seal cannot come in contact with the shaft 11.

The cylindrical part 18 of the casing 17 is preferably ground to fit in the bore 15, forming a liquid tight joint, and the casing 17 is pressed into close frictional engagement with the walls of the bore 15 in the embodiment of Fig. 1.

The oil seal is preferably provided with a packing of the type illustrated, the packing 28 consisting of a closed molded leather ring of substantially V shape in cross section.

The molded packing 28 may, in some embodiments, consist of a plurality of spiral turns of V-shaped packing, or in some cases a multiplicity of rings may be used, each ring nesting in the other and forming a member of substantially the same shape as 28, but consisting of a plurality of separate layers.

Each of the packing rings 28 is provided with a pair of frusto-conical flanges 29, 30, the flanges 29 and 30 being joined together at the apex 31 along the line of a circle. The edges 32, 33 of the packing 28 are preferably beveled off, forming relatively sharp lips 34, 35, which are sufficiently flexible to be forced into closer engagement with the shaft 11 by any pressure which may exist inside the packing 28.

By virtue of the construction and arrangement of the packing 28 and a pair of expansion members 36, 37, the packing 28 is peculiarly adapted to be fed edgewise into engagement with the interior of the casing 17 and the external surface of shaft 11.

Referring to Fig. 3, this is an illustration of the section of the expansion members on the expansible V-shaped packing 28. The spring 70 forces the internal expansion member 36 against the packing at the points 38 and 39, forcing the lips 34 and 35 outward and forcing the flanges 29 and 30 outward into engagement with the inner wall of the casing surface and the shaft 11. The external expansion member 36 holds the apex of the packing against axial movement. The leather packing 28 is thus fed edgewise into engagement with the shaft 11, and as fast as the edge of the packing wears off a new surface is presented and the spring 70 and expansion members keep the leather packing 28 in continuous oil tight engagement with the shaft 11.

Referring to Fig. 3, the dotted line position of the packing 28 is an illustration of the feeding action of the expansion members on the V-shaped packing. This feeding action continues as long as the flanges 29 and 30 of the leather packing are wider than the space within which they are forced by the expansion members and the present oil seal is therefore adapted to compensate for wear and continuously maintain an oil tight or liquid tight joint above the shaft 11.

Referring to Fig. 2, the inner expansion member may be made of sheet metal and pressed to the shape shown, being provided with an annular flange 43 of substantially tubular shape for engaging the inside of the packing.

The expansion member 37 preferably comprises a stamped sheet metal member having an annular concave surface which is of less angularity than the external surface 46 of the packing 28; that is, the curved annular surface 34a initially engages the apex 31 of the packing 28 and tends to expand the packing. The expansion member 36 in the embodiment of Figs. 1 and 2 is formed by the radially extending flange 19, which is a part of the casing of the oil seal.

In the embodiment of Figs. 1 and 2, the parts of the oil seal are preferably permanently secured together, and therefore the oil seal is preferably provided with a cover 63 which comprises a stamped sheet metal member of circular shape. This cover is preferably provided with a downwardly turned flange 66 at its border and with the frusto-conical flange 67 surrounding the centrally located aperture 68. The frusto-conical flange 67 has the camming surface 65 and the upper surface of the flange 62 of the inner expansion member cooperates with the aperture 68 so as to substantially close this part of the casing, forming a spring chamber 69.

The cover 63 is preferably a close frictional fit inside the wall of the oil seal casing, and the upper edge 71 of the casing wall is preferably spun over to secure the cover 63 in place. A garter spring 70, which preferably comprises a helical spring having its ends joined, is located in the spring chamber 69, and the spring 70 is tensioned against the frusto-conical surface 65.

The operation of this oil seal is as follows: The tension of the garter spring 70 tends to cause the contraction of the spring 70 into the V-shaped opening between the frusto-conical surfaces 64, 65. Spring 70 thus tends to cam the surfaces apart and urges the inner expansion member downward, in Figs. 1 and 2, against the flanges of the leather V-shaped packing. The leather packing is thus continuously expanded and fed edgewise into engagement with the shaft 11, and the wear of the leather packing is thus continuously taken up and an oil and water tight joint is constantly maintained about the shaft 11.

This oil seal also preferably has its outer surface ground to fit in the bore about the shaft, and while the packing is not renewable without taking the oil seal apart, the amount of expansion attained by this packing and its expanders is such that the oil seal is capable of performing its functions for substantially the full life of the machinery upon which it is used.

The present oil seals are capable of giving long service without necessity for replacement or repair and the leather packing is automatically fed into place edgewise to continuously present a new surface and maintain an oil tight contact with the moving shaft.

The sharp lips on the packing maintain a better seal than packings of other shape, for the reason that the relatively thin lips of the packing are flexible and they are so arranged that they are forced into closer engagement with the shaft by the expansion members and by the exertion of pressure inside the packing.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by United States Letters Patent is:

1. In an oil seal, a casing comprising a stamped sheet metal member formed with a cylindrical outer wall and with an end wall having a centrally located bore and an annular ridge located midway between the outer wall and the edge of said bore, an end plate comprising a metal member formed with a centrally located bore, said member being circular in shape and frictionally secured in said outer wall, the outer wall being spun over outside of said end plate, and said end plate having an inwardly extended frusto-conical flange adjacent said centrally located bore, a packing in said casing and an expansion member for engaging said packing, and having a frusto-conical surface extending transversely to said frusto-conical flange, said expansion member being slidably mounted in said casing and having a centrally located bore, and tension means engaging said frusto-conical surface and frusto-conical flange to force said expansion member into engagement with said packing.

2. In an oil seal, a casing comprising a stamped sheet metal member formed with a cylindrical outer wall and with an end wall having a centrally located bore and an annular ridge located midway between the outer wall and the edge of said bore, an end plate comprising a metal member formed with a centrally located bore, said member being circular in shape and frictionally secured in said outer wall, the outer wall being spun over outside of said end plate and said end plate having an inwardly extending frusto-conical flange adjacent said centrally located bore, a packing in said casing and an expansion member for engaging said packing and having a frusto-conical surface extending transversely to said frusto-conical flange, said expansion member being slidably mounted in said casing and having a centrally located bore, and tension means engaging said frusto-conical surface and frusto-conical flange to force said expansion member into engagement with said packing, said expansion member being formed with an angular ridge located midway between its outer edge and the edge of the centrally located bore, said packing comprising a V-shaped radially expansible packing having two frusto-conical flanges joined along the line of a circle and engaging the end of the casing only at the apex of said flanges, said packing being engaged by said expansion member adjacent the inner and outer edges of said packing whereby axial movement of said expansion member tends to cause said packing to become wider and expand by virtue of the decrease in angularity of its frusto-conical flanges.

CHARLES W. MARSH.